United States Patent
Blase et al.

(10) Patent No.: US 11,820,238 B2
(45) Date of Patent: Nov. 21, 2023

(54) CURRENT COLLECTOR FOR A NON-RAIL-BOUND, ELECTRIC TRACTION VEHICLE, TRACTION VEHICLE HAVING A CURRENT COLLECTOR OF THIS TYPE AND METHOD FOR OPERATING A CURRENT COLLECTOR OF THIS TYPE

(71) Applicant: SIEMENS MOBILITY GMBH, Munich (DE)

(72) Inventors: Bastian Blase, Berlin (DE); Steffen Jakobi, Berlin (DE); Lennart Kilian, Gauting (DE); Stephan Krueger, Berlin (DE); Andre Tolksdorf, Berlin (DE); Florian Buehs, Berlin (DE)

(73) Assignee: Siemens Mobility GmbH, Munich (DE)

(*) Notice: Subject to any disclaimer, the term of this patent is extended or adjusted under 35 U.S.C. 154(b) by 407 days.

(21) Appl. No.: 17/272,415

(22) PCT Filed: Aug. 19, 2019

(86) PCT No.: PCT/EP2019/072094
§ 371 (c)(1),
(2) Date: Mar. 1, 2021

(87) PCT Pub. No.: WO2020/043523
PCT Pub. Date: Mar. 5, 2020

(65) Prior Publication Data
US 2021/0316612 A1  Oct. 14, 2021

(30) Foreign Application Priority Data

Aug. 31, 2018 (DE) ..................... 10 2018 214 873.2

(51) Int. Cl.
*B60L 5/26* (2006.01)
*B60L 5/32* (2006.01)
(Continued)

(52) U.S. Cl.
CPC .................. *B60L 5/26* (2013.01); *B60L 5/18* (2013.01); *B60L 5/22* (2013.01); *B60L 5/24* (2013.01);
(Continued)

(58) Field of Classification Search
CPC ...... B60L 5/26; B60L 5/32; B60L 5/36; B60L 5/22; B60L 5/28; B60L 5/18; B60L 5/24
See application file for complete search history.

(56) References Cited

U.S. PATENT DOCUMENTS

| 4,034,832 A | * | 7/1977 | Lewis | ....................... B60L 3/04 191/86 |
| 2014/0097054 A1 | | 4/2014 | Francke et al. | |
| 2020/0231044 A1 | | 7/2020 | Francke | |

FOREIGN PATENT DOCUMENTS

| CN | 102431458 A | 5/2012 |
| DE | 3903140 A1 * | 8/1989 |

(Continued)

*Primary Examiner* — S. Joseph Morano
*Assistant Examiner* — James William Jones
(74) *Attorney, Agent, or Firm* — Laurence A. Greenberg; Werner H. Stemer; Ralph E. Locher

(57) ABSTRACT

A current collector for a non-rail-bound, electric traction vehicle has an articulated support linkage, which, on the contact wire side, supports rocker assemblies with contact strips and, on the vehicle side, has a base joint for articulation to the traction vehicle. A pneumatic reciprocating drive is coupled to the support linkage for raising the rocker assemblies from a lower parking position into an upper contact position when the reciprocating drive is pressurized and for lowering into the parking position under its own weight when depressurization occurs. An exhaust air line connects the reciprocating drive to the environment to lower the rocker assemblies. An air accumulator and a downstream throttle valve are connected between the reciprocating drive and an environment opening of the exhaust air line. The rocker assemblies can be quickly lowered and nevertheless (Continued)

brought into the parking position without damage in order to disengage the current collector.

3 Claims, 2 Drawing Sheets

(51) Int. Cl.
    *B60L 5/36*     (2006.01)
    *B60L 5/28*     (2006.01)
    *B60L 5/22*     (2006.01)
    *B60L 5/18*     (2006.01)
    *B60L 5/24*     (2006.01)

(52) U.S. Cl.
    CPC ................... *B60L 5/28* (2013.01); *B60L 5/32* (2013.01); *B60L 5/36* (2013.01)

(56) References Cited

FOREIGN PATENT DOCUMENTS

| | | | | |
|---|---|---|---|---|
| DE | 0388805 A2 | * | 9/1990 | |
| DE | 10324790 A1 | * | 12/2004 | ................ B60L 5/28 |
| DE | 102012213460 A1 | * | 2/2014 | .......... B60L 11/1842 |
| DE | 102012213460 A1 | | 2/2014 | |
| DE | 102013217429 A1 | * | 3/2015 | ................ B60L 5/18 |
| DE | 102015005843 A1 | | 11/2016 | |
| DE | 102017203046 A1 | | 8/2018 | |
| FR | 3102414 A1 | * | 4/2021 | ................ B60L 5/16 |
| WO | WO-2015112174 A1 | * | 7/2015 | |

\* cited by examiner

CURRENT COLLECTOR FOR A NON-RAIL-BOUND, ELECTRIC TRACTION VEHICLE, TRACTION VEHICLE HAVING A CURRENT COLLECTOR OF THIS TYPE AND METHOD FOR OPERATING A CURRENT COLLECTOR OF THIS TYPE

BACKGROUND OF THE INVENTION

Field of the Invention

The invention relates to a current collector for a non-rail-bound, electric traction vehicle in accordance with the preamble of claim 1. The invention furthermore relates to a traction vehicle with a current collector of this type. The invention further relates to a method for operating a current collector of this type.

Electric traction vehicles with current collectors for the supply of traction from a trackside overhead line system in rail-bound railroad traffic for transporting goods or persons are sufficiently well-known. However, non-rail-bound traction vehicles, in particular trucks, with a diesel electric drive and with current collectors for feeding electrical energy from an overhead line system have also been known for some time. Because road vehicles of this type are fitted with rubber tires, electrified traffic lanes with a two-pole overhead line system are necessary, which mount contact wires embodied as forward and return conductors over said traffic lane. Accordingly, the current collector must also be embodied as two-pole. A current collector of this type is known from the older German patent application with the official file reference 102017203046.1.

In contrast to rail-bound railroad traffic, non-rail-bound road vehicles must share the roadway, which in addition to an electrified traffic lane may have a non-electrified one as well, with conventional motor vehicles without a current collector. Road vehicles of this type must also enter and leave roads with electrified traffic lanes safely and be able to switch between electrified and non-electrified traffic lanes, for instance for overtaking or evasive maneuvers. Hence when operating a traction vehicle of this type on roads, both planned and unexpected driving situations occur in which the current collector has to be disengaged. In the case of the known current collector, which is described in greater detail in FIG. 1, the pressurized air is released into the environment during the lowering of the rocker assemblies with an approximately constant volume flow. So that in its lower parking position the current collector does not impact at too high a speed, which entails the risk of damage, a moderate lowering speed is regulated by the flow cross-section in the exhaust air duct. On the other hand, a rapid lowering of the rocker assemblies is necessary, for example in the event of sudden driving maneuvers when switching the electrified traffic lane, so that damage to the current collector and the contact wires of the overhead line system is prevented.

SUMMARY OF THE INVENTION

The object of the invention is hence to provide a current collector of the type mentioned in the introduction and a method for operating a current collector of this type, with which the rocker assemblies can be lowered quickly to disengage the current collector and nevertheless can be brought into their parking position without damage.

This object is achieved by a current collector according to claim 1 and by a method for operating a current collector of this type according to claim 4.

The current collector for a non-rail-bound, electric traction vehicle is provided for feeding electrical energy from a two-pole overhead line system with contact wires embodied as forward and return conductors. It comprises an articulated support linkage, which, on the contact wire side, supports rocker assemblies having contact strips and, on the vehicle side, has a base joint for articulation to the traction vehicle. The current collector further comprises a pneumatic reciprocating drive, which is coupled to the support linkage such that the rocker assemblies can be raised from a lower parking position into an upper contact position when the reciprocating drive is pressurized and can be lowered into the parking position under their own weight when depressurization occurs. According to the invention the reciprocating drive can be connected to the environment by means of an exhaust air line in order to lower the rocker assemblies. In this case an air accumulator and a throttle valve arranged downstream thereof are connected between the reciprocating drive and an environment opening of the exhaust air line. A two-way valve, which can be electrically actuated, is arranged in the exhaust air line to connect the reciprocating drive to the environment. In the actuated state the two-way valve releases an intake air duct from a pressurized air supply to the reciprocating drive in order to raise the current collector or in order to press the engaged current collector against the contact wires with the required pressure force. If the two-way valve receives a control signal for disengagement or if it is without current because of a fault, a spring force switches the valve into the non-actuated state, in which it releases an exhaust air duct from the reciprocating drive to the air accumulator. Likewise, the intake air duct could be released in the actuated state and the exhaust air duct in the non-actuated state.

According to the invention the rocker assemblies are lowered in two stages: in a first fast lowering phase the rocker assemblies are lowered out of the contact position into an intermediate position and in a second parking lowering phase from the intermediate position into the parking position. During the fast lowering phase exhaust air flows out of the reciprocating drive into the air accumulator under the own weight of the rocker assemblies with a first volume flow, whereas during the parking lowering phase exhaust air flows out of the filled air accumulator through the throttle valve with a second volume flow which is restricted compared to the first volume flow.

In a preferred embodiment of the inventive current collector the storage capacity of the air accumulator is dimensioned to be less than an operating volume of the reciprocating drive. This means that when the rocker assemblies are lowered the intermediate position lies just above the parking position, such that the lowering path is traversed in a short time during the fast lowering phase with a higher lowering speed. During the parking lowering phase the exhaust air flow through the throttle valve and thus the lowering speed of the rocker assemblies is reduced. As a result, the current collector travels slowly and safely toward the lower parking position and reaches it without a severe impact.

Further properties and advantages of the invention will emerge from the following description of an exemplary embodiment with the aid of the drawings, in which, in a schematic presentation:

DETAILED DESCRIPTION OF THE INVENTION

Figure 1:
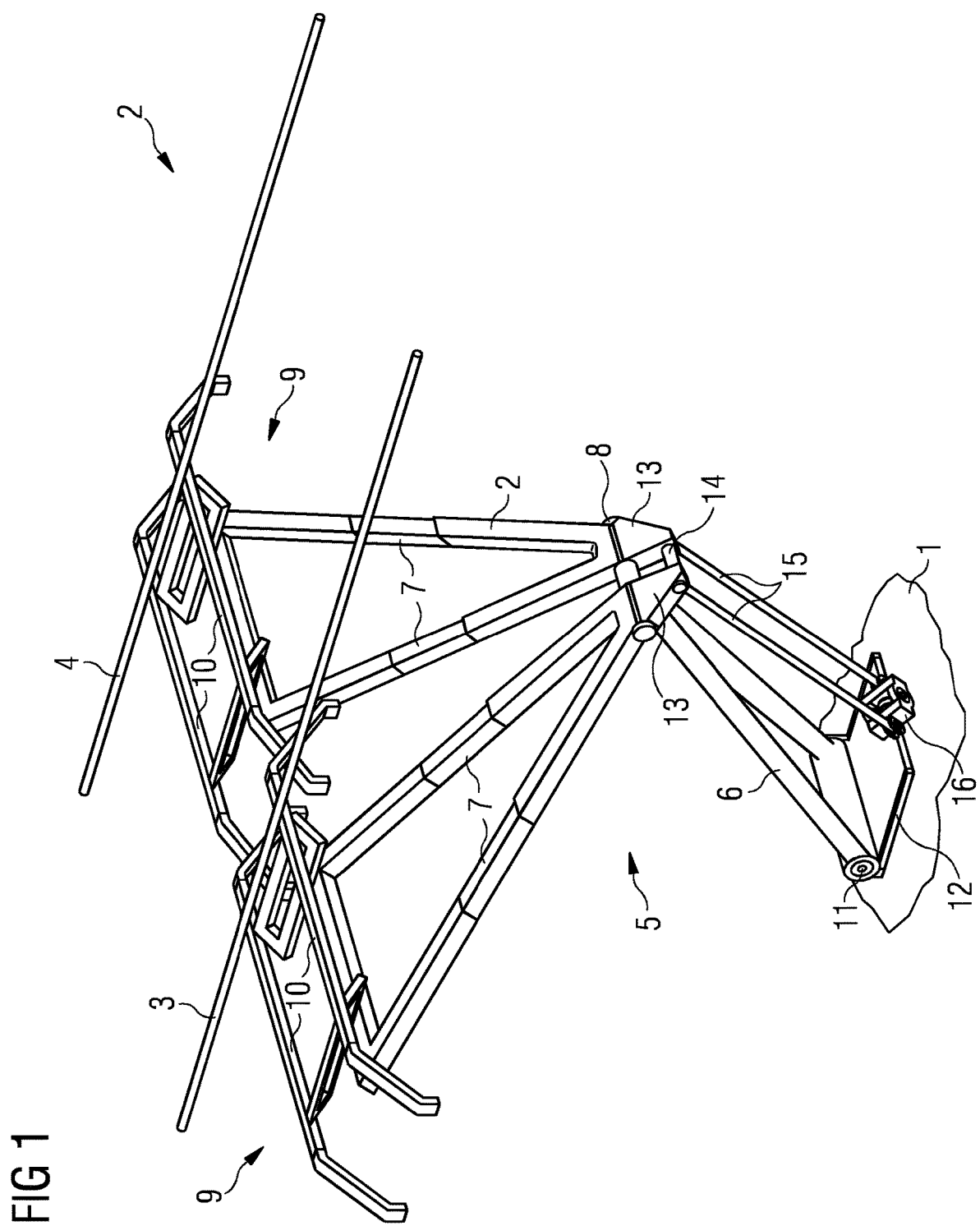
FIG. 1 shows a known current collector in a perspective view.

According to FIG. 1 a non-rail-bound, electric traction vehicle 1, in particular a road vehicle with a diesel electric drive, for instance a truck or bus, comprises a current collector 2, via which electrical energy can be fed from an overhead line system, including during the journey. The overhead line system is embodied as two-pole and comprises contact wires 3, 4 embodied as forward and return conductors running over a roadway, for the provision of electrical energy. The current collector 2 is embodied as a half-scissor pantograph and comprises an articulated support linkage 5 with a lower arm 6 and two upper arms 7, each of which is pivotably connected thereto by means of a shaft 8 arranged on the lower arm 6. Each of the two upper arms 7 supports a rocker assembly 9 on the contact wire side with two parallel contact strips 10 which are arranged one behind the other transversely to a vehicle longitudinal axis. To articulate the current collector 2 to the traction vehicle 1, the lower arm 6 is pivotably connected on the vehicle side to a base plate 12 via a base joint 11. The base plate 12 can for example be mounted on the roof of the traction vehicle 1, said roof being partially depicted in FIG. 1. The two upper arms 7 each have an end piece 13 projecting out over the shaft 8, through which a common shaft 14 extends. A connecting rod 15 is connected via the shaft 14 in an articulated manner to one of the end pieces 13 of the upper arms 7 in each case. Furthermore, the two connecting rods 15 are connected in an articulated manner to the base plate 12 via a cross-piece support 16.

Figure 2:
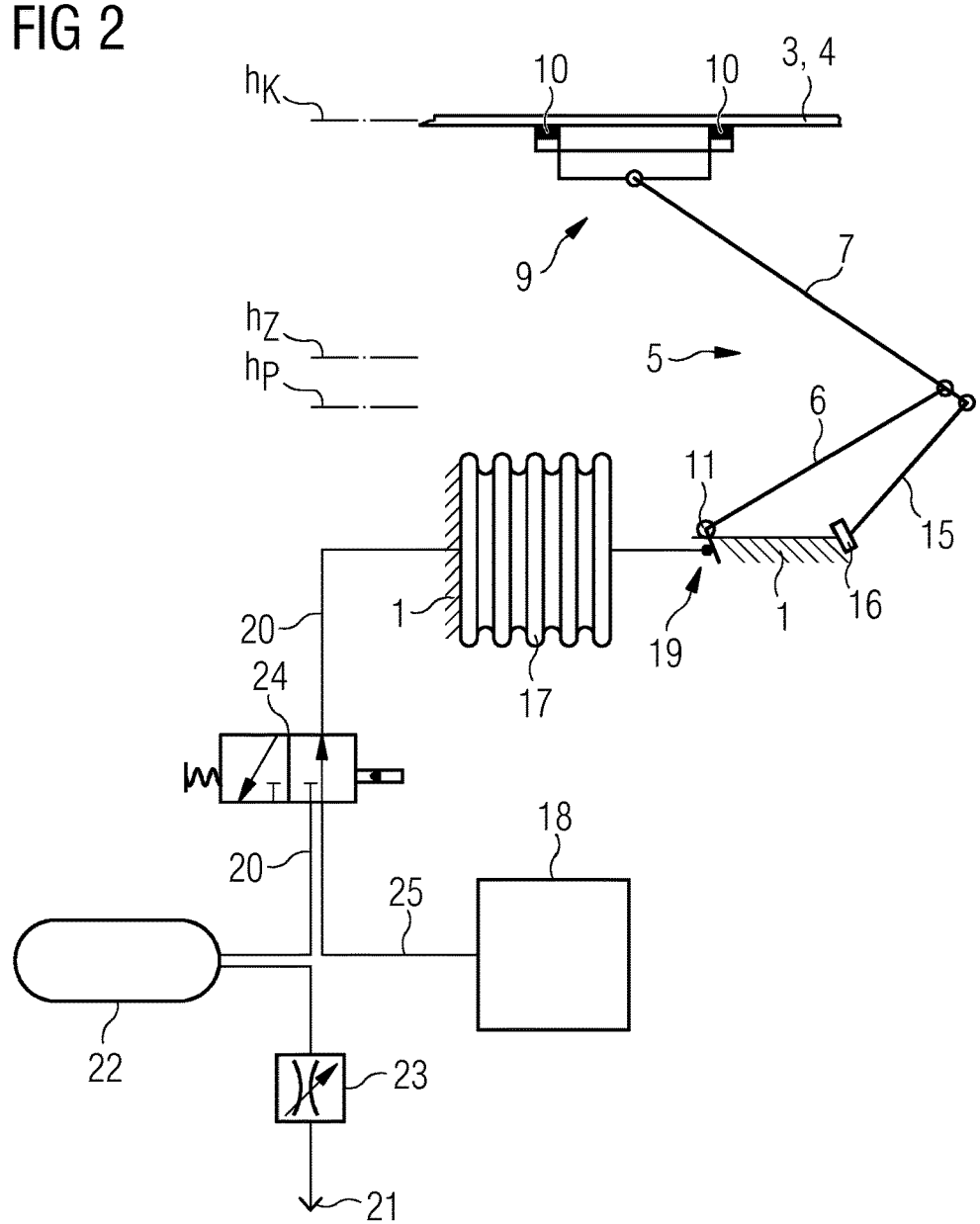
FIG. 2 shows a circuit diagram of a pneumatic circuit for the operation of the current collector and FIG. 3 shows a time-distance diagram of the rocker assembly when it is lowered.

According to FIG. 2 a pneumatic reciprocating drive 17 in the form of an air-suspension bellows is coupled to the support linkage 5 such that the rocker assembly 9 can be raised from a lower parking position $h_P$ into an upper contact position $h_K$ when the reciprocating drive 17 is pressurized. The pressurization is effected by a pressurized air supply 18, which may include—not depicted in greater detail—a compressor, a pressurized air container, an oil/water separator and a pressure control device. Suitable mechanical coupling means 19 convert a linear positioning force of the reciprocating drive 17 into a torque of the lower arm 6 in the base joint 11. In the parking position $h_P$ the support linkage 5 of the disengaged current collector 2 is folded up, such that the traction vehicle 1 does not exceed the permissible overall vehicle height to be adhered to when operating outside electrified routes and the current collector 2 is positioned in an electrically safe state. The current collector 2 must also be disengaged before the traction vehicle 1 switches safely to a non-electrified traffic lane, for instance during overtaking maneuvers. When the current collector 2 is engaged, the connecting rods 15 force the upper arms 7 to be raised if the lower arm 6 is raised. In the contact position $h_K$ the contact strips 10 of the rocker assemblies 9 are each pressed onto one of the contact wires 3, 4 of the overhead line system, such that both when stationary and during the journey energy can be transmitted from the overhead line system to the traction vehicle 1. In order to transfer the rocker assemblies 9 from the contact position $h_K$ into the parking position $h_P$ a depressurization of the reciprocating drive 17 takes place, such that under their own weight the rocker assemblies 9 are lowered and the support linkage 5 folds up. Pressurized air then escapes from the reciprocating drive 17 into the environment via an exhaust air line 20.

According to the invention an air accumulator 22 and a throttle valve 23 arranged downstream thereof are connected between the reciprocating drive 17 and an environment opening 21 of the exhaust air line 20. A storage capacity of the air accumulator 22 is preferably in this case dimensioned to be less than an operating volume of the reciprocating drive 17. An electrically actuatable two-way valve 24, to which an intake air line 25 coming from the pressurized air supply 18 is also connected, is arranged in the exhaust air line 20 between the reciprocating drive 17 and the air accumulator 22. In the actuated state of the two-way valve 24 a pneumatic connection exists between the pressurized air supply 18 and the reciprocating drive 17, such that the current collector 2 can be engaged or in the engaged state a downforce of the contact strips 10 onto the contact wires 3, 4 can be controlled. In this state the section of the exhaust air line 20 running between the two-way valve 24 and the reciprocating drive 17 is used as an intake air line. In the electrically non-actuated state the two-way valve 24 releases a pneumatic connection between the reciprocating drive 17 and the air accumulator 22, while the connection of the intake air line 25 is blocked. This state is also adopted if the two-way valve 24 is without current as a result of a fault, so that in the event of a fault an automatic lowering of the current collector 2 is initiated.

Figure 3:
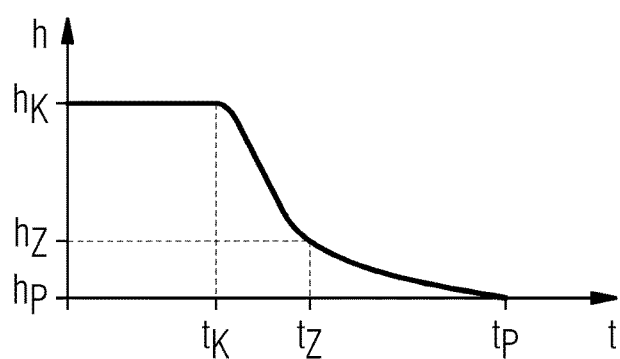

On termination of the actuation of the two-way valve 24 at a time $t_K$ at which the rocker assemblies 9 according to FIG. 3 are in their upper contact position $h_K$, the reciprocating drive 17 is depressurized and the pressurized air located in its operating volume escapes into the air accumulator 22, under the own weight of the rocker assemblies 9, until the air accumulator 22 is full. If the storage capacity of the air accumulator 22 is dimensioned to be less than the operating volume of the reciprocating drive 17, the lowered rocker assemblies 9 adopt an intermediate position $h_Z$ at this time $t_Z$ which lies only slightly above the parking position $h_P$. As from the time $t_Z$ the exhaust air flow—still driven by its own weight—out of the air accumulator 22 into the environment is reduced by the cross-section of the downstream throttle valve 23, until the rocker assemblies 9 have reached their lower parking position $h_P$ at time $t_P$.

According to the invention, the lowering of the rocker assemblies 9 takes place in two stages in a first fast lowering phase of the period $t_K$-$t_Z$ and in a second parking lowering phase of the period $t_P$-$t_Z$. During the fast lowering phase the air flows out of the reciprocating drive 17 into the air accumulator 22 with a first volume flow which is mainly determined by the line cross-section of the exhaust air line 20, whereas during the parking lowering phase air flows out of the air accumulator 22 into the environment with a second volume flow. The second volume flow is restricted by the small, adjustable cross-section of the throttle valve 23 compared to the first volume flow, such that the lowering speed of the rocker arrangements 9 in the parking lowering phase is less than during the fast lowering phase. This means that on termination of the actuation of the two-way valve 24 the rocker assemblies 9 travel a comparatively long lowering path $h_K$-$h_Z$ into the intermediate position $h_Z$ in a comparatively short period $t_Z$-$t_K$, in order quickly to put a distance between themselves and the contact wires 3, 4 of the overhead line system. Furthermore, the rocker assemblies 9 traverse the remaining lowering path $h_Z$-$h_P$ slowly, so that the current collector 2 moves gently into its parking position $h_P$, without being exposed to high mechanical impact stresses. This is advantageously achieved according to the invention without the use of expensive controllable throttle valves.

The invention claimed is:

1. A current collector for a non-rail-bound, electric traction vehicle for feeding electrical energy from a two-pole overhead line system with contact wires forming forward and return conductors, the current collector comprising:
- an articulated support linkage, rocker assemblies with contact strips supported on a contact wire side of said support linkage, and a base joint for articulation of said support linkage to the traction vehicle;
- a pneumatic reciprocating drive coupled to said support linkage for selectively raising said rocker assemblies from a lower parking position into an upper contact position when said reciprocating drive is pressurized and lowering said rocker assemblies into the parking position under their own weight upon depressurization of said reciprocating drive;
- an exhaust air line for connecting said reciprocating drive to the environment in order to lower said rocker assemblies;
- an air accumulator and a throttle valve arranged downstream of said air accumulator connected between said reciprocating drive and an environment opening of said exhaust air line; and
- a storage capacity of said air accumulator being dimensioned to be less than an operating volume of said reciprocating drive.

2. A non-rail-bound, electric traction vehicle, comprising a current collector according to claim 1.

3. A method of operating a current collector of a non-rail-bound, electric traction vehicle for feeding electrical energy from a two-pole overhead line system with contact wires forming forward and return conductors, the method comprising:
- providing a current collector for a non-rail-bound, electric traction vehicle for feeding electrical energy from a two-pole overhead line system with contact wires forming forward and return conductors, the current collector having:
  - an articulated support linkage, rocker assemblies with contact strips supported on a contact wire side of said support linkage, and a base joint for articulation of said support linkage to the traction vehicle;
  - a pneumatic reciprocating drive coupled to said support linkage for selectively raising said rocker assemblies from a lower parking position into an upper contact position when said reciprocating drive is pressurized and lowering said rocker assemblies into the parking position under their own weight upon depressurization of said reciprocating drive;
  - an exhaust air line for connecting said reciprocating drive to the environment in order to lower said rocker assemblies; and
  - an air accumulator and a throttle valve arranged downstream of said air accumulator connected between said reciprocating drive and an environment opening of said exhaust air line;
- lowering the rocker assemblies in two stages, including a fast lowering phase from the contact position into an intermediate position and a parking lowering phase from the intermediate position into the parking position;
- during the fast lowering phase, enabling exhaust air to flow out of the reciprocating drive under the own weight of the rocker assemblies into the air accumulator with a first volume flow and, during the parking lowering phase, to flow out of the filled air accumulator through the throttle valve with a second volume flow that is restricted compared to the first volume flow.

* * * * *